United States Patent
Brinkmann et al.

(10) Patent No.: US 10,358,970 B2
(45) Date of Patent: Jul. 23, 2019

(54) COOLING ASSEMBLY FOR TEMPERATURE CONTROL

(71) Applicant: Ford Global Technologies, LLC, Dearborn, MI (US)

(72) Inventors: Bernd Brinkmann, Dormagen (DE); Johann Wegers, Cologne (DE); Thomas Nitsche, Neuss (DE); Julian Tietze, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/863,610

(22) Filed: Jan. 5, 2018

(65) Prior Publication Data

US 2018/0202347 A1    Jul. 19, 2018

(30) Foreign Application Priority Data

Jan. 17, 2017    (DE) .......................... 10 2017 200 684

(51) Int. Cl.
| | | |
|---|---|---|
| *F01P 7/12* | (2006.01) | |
| *B60K 11/04* | (2006.01) | |
| *F01P 7/16* | (2006.01) | |
| *F01P 1/06* | (2006.01) | |
| *F01P 3/20* | (2006.01) | |

(52) U.S. Cl.
CPC .................................... *F01P 7/12* (2013.01); *F01P 7/16* (2013.01); *F01P 1/06* (2013.01); *F01P 3/20* (2013.01); *Y02T 10/146* (2013.01)

(58) Field of Classification Search
CPC ...... F01P 7/10; F01P 11/10; F01P 1/06; F01P 2001/005; F01P 11/00; F01P 5/06; B60K 11/085; B60K 11/04
See application file for complete search history.

(56) References Cited

U.S. PATENT DOCUMENTS

| | | | | |
|---|---|---|---|---|
| 3,768,754 A * | 10/1973 | Janes | ....................... | B64G 1/50 126/572 |
| 4,489,883 A * | 12/1984 | Anderson | ............ | F01P 11/0238 220/201 |
| 7,287,523 B1 * | 10/2007 | Fonville | ........... | F02M 35/10222 123/568.18 |
| 8,091,516 B2 | 1/2012 | Preiss | | |
| 8,434,692 B2 * | 5/2013 | Scott | ........................ | F23R 3/06 137/467 |
| 2007/0199751 A1 * | 8/2007 | Bradley | ............... | B60K 11/085 180/68.1 |

(Continued)

FOREIGN PATENT DOCUMENTS

| | | |
|---|---|---|
| DE | 1170441 B | 5/1964 |
| DE | 8815794 U1 | 4/1990 |

(Continued)

*Primary Examiner* — Long T Tran
(74) *Attorney, Agent, or Firm* — Julia Voutyras; McCoy Russell LLP (57) ABSTRACT

Methods and systems are provided for cooling assembly configured to control a temperature of a vehicle component relying on cooling from a cooling air stream. In one example the cooling assembly may include a plurality of blades fixed to a surface of a cooling device. The cooling assembly may be bimetallic so that a position of the blades is self-regulatory and automatically adjusted based on heat conduction.

18 Claims, 7 Drawing Sheets

(56) References Cited

U.S. PATENT DOCUMENTS

| | | | |
|---|---|---|---|
| 2007/0290066 A1* | 12/2007 | McGee | A01M 1/2044 239/57 |
| 2010/0089468 A1* | 4/2010 | Scott | F23R 3/06 137/468 |
| 2011/0099990 A1 | 5/2011 | Lang et al. | |
| 2017/0130634 A1* | 5/2017 | Li | F01N 5/02 |

FOREIGN PATENT DOCUMENTS

| | | |
|---|---|---|
| DE | 19604854 A1 | 8/1997 |
| DE | 202005010683 U1 | 9/2005 |
| DE | 102013201657 A1 | 8/2013 |
| EP | 2172357 A2 | 4/2010 |
| JP | 2000320331 A | 11/2000 |
| WO | 0146570 A1 | 6/2001 |

\* cited by examiner

COOLING ASSEMBLY FOR TEMPERATURE CONTROL

CROSS REFERENCE TO RELATED APPLICATION

This application claims priority to German Patent Application No. 102017200684.6, filed on Jan. 17, 2017. The entire contents of the above-referenced application are hereby incorporated by reference in its entirety for all purposes.

FIELD

The present description relates generally to methods and systems for controlling a temperature of a vehicle component.

BACKGROUND/SUMMARY

The ability to control the heating and cooling of engine systems as well as other elements included in a vehicle may affect the efficiency and performance of the system or element. A cooling assembly may be used to control a temperature of a vehicle component, such as a combustion engine, an AC component, or a vehicle battery. The cooling assembly may comprise a plurality of blades controlling a cooling air stream, where the plurality of blades control the size of at least one air inlet opening and/or the flow of the cooling air stream. By adapting the vehicle component with the cooling assembly, a method for controlling said temperature is provided.

Engine blocks are often coupled to a radiator that flows a coolant through a circuit that extracts heat from combustion chambers of the engine. The radiator is arranged in front of the engine block in a front compartment of the vehicle and is itself cooled by air directed to flow across a surface of the radiator. In turbocharged engine systems, an additional heat exchanger may be positioned in front of the radiator. The second heat exchanger is typically a charge air cooler (CAC) that cools air boosted by the turbocharger and may also rely on air-to-air cooling to transfer heat away from the boosted air.

Air flow is often channeled to the heat exchangers by incorporating a grille in the front end of the vehicle so that ram air may stream across the heat exchangers during vehicle navigation. In modern cooling systems, shut-off devices are used to vary rates of airflow across a surface of a heat exchanger. For example, with a low external temperature or during a warm-up phase of a combustion engine, the airflow across an engine radiator may be controlled or regulated. One example of a device for controlling temperature controlling an air throughput of an air inlet in the front region of a motor vehicle is shown by Fischer et al. in EP Patent No. 2 172 357. Therein, a blocking device is described that has at least two different blocking elements which are displaceable with respect to one another and which through such displacement determines a degree of opening width of the blocking device. A power-operated actuation of one of the blocking elements may be induced by a bimetal deformation.

Another example of a device controlling an air throughput of an air inlet in the front region of a motor vehicle is shown and described by Preiss in U.S. Pat. No. 8,091,516. The device, comprising blades arranged in a louver formation, with a bypass channel blockable by a further blade, includes an actuating element controlling all the blades which are arranged in front of the radiator. The device may include a bimetallic actuator.

However, the inventors herein have recognized potential issues with such systems. As one example, the openings accommodating air flow in the devices described above may be large, resulting in increased drag on the vehicle. This issue may be alleviated by the incorporation of active grille shutters (AGS) where the individual louvers of the grille may be actuated between open and closed positions to regulate air flow therethrough. Thus drag may be minimized by closing the AGS when cooling demand is low. The AGS is opened or closed by an actuator, however, that may increase costs as well as demanding additional space to accommodate placement of the actuator proximal to the AGS. Furthermore opening of the AGS to allow maximum cooling capacity imposes severe drag on the vehicle.

In one example, the issues described above may be addressed by a device for controlling a temperature of a vehicle component, comprising a plurality of blades coupled to a first of a second cooling device of the vehicle and controlling a cooling air stream, the plurality of blades controlling a size of at least one air inlet opening and/or a flow of the cooling air stream, the plurality of blades comprising bimetallic blades configured such that bending and movement of each blades takes place automatically with a change of temperature of each blade in order to control the cooling air stream by varying a position of each blade. In this way, a device for may control a temperature of a vehicle component, such as a combustion engine, an AC component or a vehicle battery, by means of a cooling device of the vehicle which makes use of a plurality of blades controlling a cooling air stream, which blades control the size of at least one air inlet opening and/or the flow of the cooling air stream; and to a method for controlling said temperature.

As one example, a cooling assembly with a compact structure that is low cost with improved aerodynamic properties may be used to replace the AGS. The cooling assembly allows a combustion engine to be brought to an optimum operating temperature at which it works most efficiently. Unnecessary wear of the engine and unnecessary fuel consumption are thereby avoided. For example, undesired cooling during a warm-up phase of the engine is avoided by providing a self-regulating heat-exchanger shut-off flap arrangement.

The device may be configured for use with vehicles or motor vehicles which require cooling systems for different applications, e.g., a combustion engine, an AC component or a so-called "AC condenser", a battery cooling arrangement, etc. The heat dissipation effected by the ambient air takes place in the heat exchanger or the radiator, which is preferably arranged in the front region of the vehicle. In order to achieve sufficient airflow through the heat exchanger, suitable openings are provided at the front end of the vehicle.

The heat exchanger and the opening required at the front end of the vehicle are dimensioned for the most unfavorable case—for example, high vehicle speed, a high load, a high trailer load, or a high external temperature. The blades may produce the effect of a smaller opening which is sufficient for most driving conditions and create low aerodynamic drag while providing cooling under different operating conditions. This is achieved by an active shut-off flap arrangement disclosed herein.

The cooling assembly may also be adapted to a combination of low-temperature and high-temperature circulation systems, for example a combination of charge air cooling and a conventional engine radiator. An existing clear space or distance between the internal parts of the heat exchangers of the low- and high-temperature circulation systems is utilized for the blades. The blades may be integrated in one of the heat exchangers so that the heat exchanger may be installed as a unit with preassembled blades, minimizing the amount of additional space occupied by the blades.

Furthermore, individual actuators are not required to rotate each shut-off flap. Thus an active control system, such as control electronics with temperature sensors, is not required to change the blade positions. The cooling assembly is thus simplified and the likelihood of mechanical degradation or electronic complications associated with actuation of the cooling assembly is minimized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
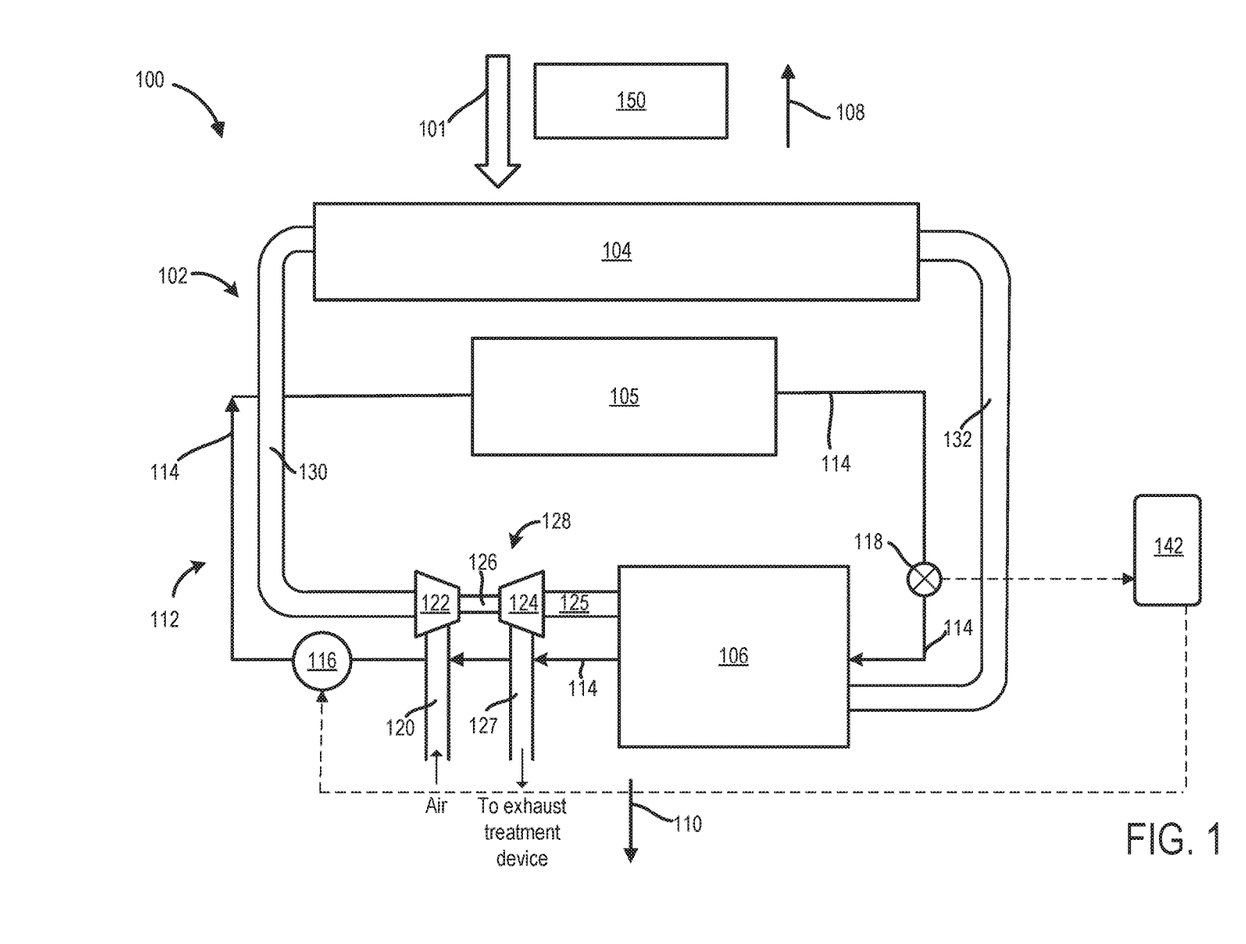
FIG. 1 is a block diagram of an engine system adapted with cooling circuits.
Figure 2:
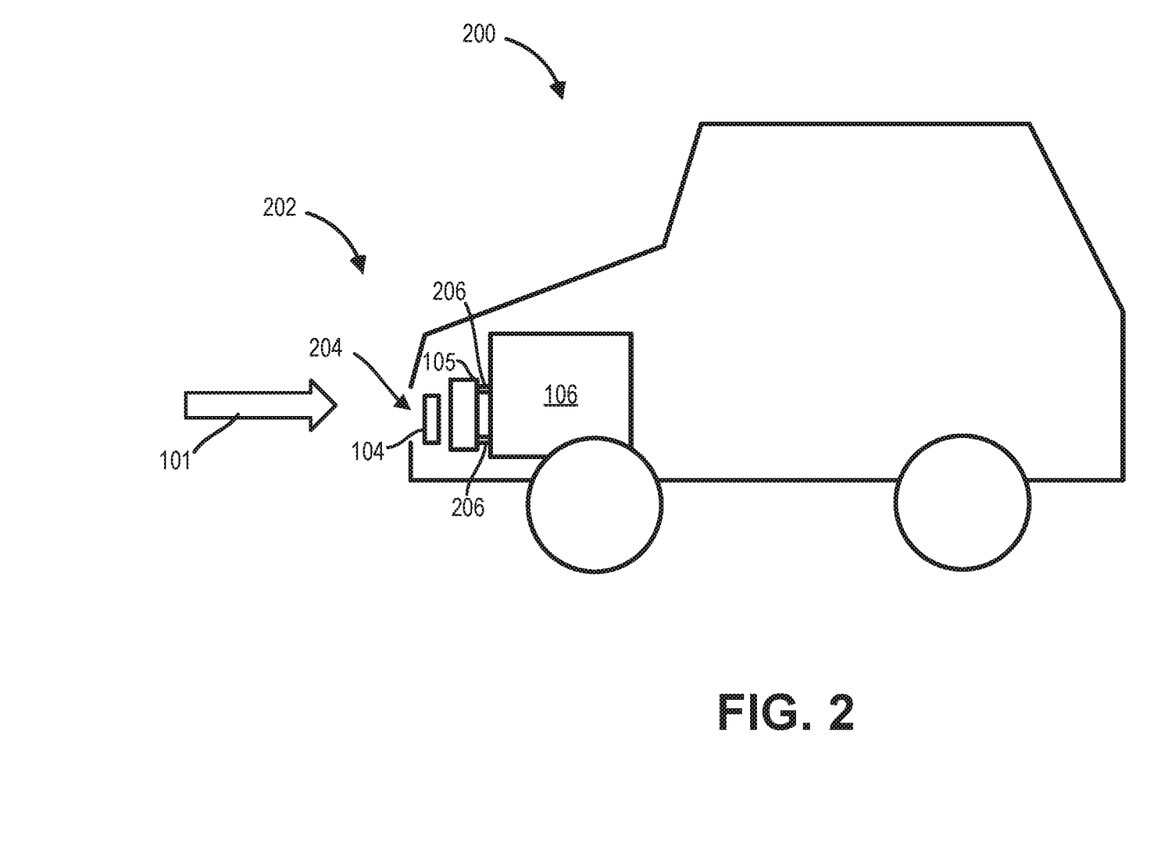
FIG. 2 is a schematic of a vehicle showing the positioning of heat exchangers coupled to an engine block.
Figure 7:
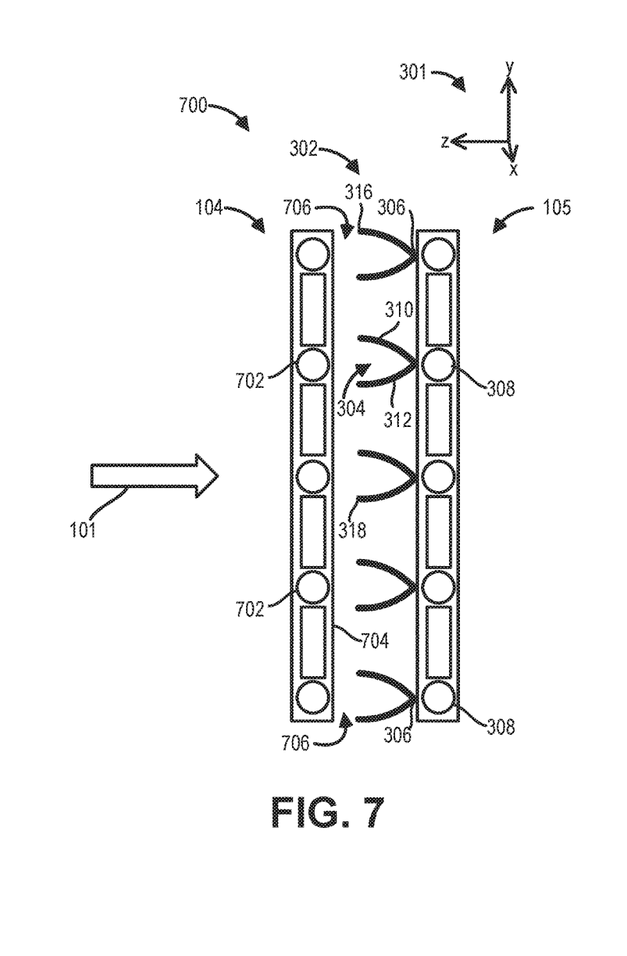
FIG. 7 is a cross-section of the arrangement of a cooling assembly on cooling channels of a high-temperature heat exchanger.
Figure 8:
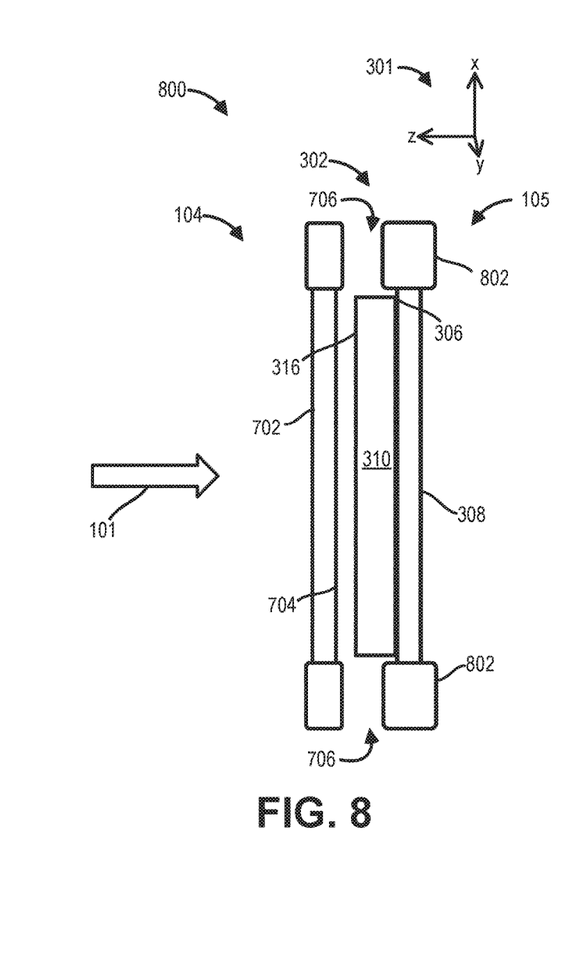
FIG. 8 is a top view of the arrangement of a cooling assembly on cooling channels of a high-temperature heat exchanger.

The following description relates to systems and methods for a cooling assembly for regulating a temperature of a vehicle component such as an engine block. A block diagram of low-temperature and high-temperature cooling circuits coupled to an engine block is shown at FIG. 1. The positioning of heat-exchangers of the low-temperature and high-temperature cooling circuits within a front end of a vehicle is illustrated at FIG. 2. An arrangement of blades of the cooling assembly coupled to a cooling channel of a first heat exchanger is shown in three positions from side views at FIGS. 3-5. A first position of FIG. 3 allows for greater air flow across a surface of the first heat exchanger than a second position of FIG. 4. A third position, shown at FIG. 5, impedes air flow across the first heat exchanger, thereby minimizing cooling of the first heat exchanger relative to the first and second positions. The coupling of the cooling assembly to the first heat exchanger is shown from a top view at FIG. 6 and shown from a side view at FIG. 7 where the arrangement also includes the positioning of the cooling assembly, connected to the first heat exchanger, relative to a second heat exchanger. A top view of the first heat exchanger adapted with the cooling assembly is depicted at FIG. 8 with the cooling assembly positioned in between the first and the second heat exchangers. At FIG. 9, the cooling assembly is shown from the side, in an alternate configuration, connected to the second heat exchanger. The coupling of the cooling assembly to the second heat exchanger, arranged between the second heat exchanger and the first heat exchanger, is shown at FIG. 10. An example method for operation of the cooling assembly is provided at FIG. 11, describing the actuation of the cooling assembly between the first, second, and third positions shown at FIGS. 3-5 based on a temperature of the heat exchanger, such as the first or the second heat exchangers, into which the cooling assembly is integrated.

A combustion engine may be brought to an optimum operating temperature at which it works most efficiently by adapting an engine with the cooling assembly described in the present disclosure. Unnecessary wear of the engine and unnecessary fuel consumption are thereby avoided. For example, undesired cooling during a warm-up phase of the engine is avoided.

The cooling assembly may be suitable for vehicles or motor vehicles which require cooling systems for different applications, for example, for a combustion engine, an AC component or a so-called "AC condenser", a battery cooling arrangement and the like. The heat dissipation effected by the ambient air takes place in the heat exchanger or the radiator, which may be arranged in the front region of the vehicle. In order to achieve sufficient airflow through the heat exchanger, suitable openings are provided at the front end of the vehicle.

A heat exchanger and the opening required at the front end of the vehicle are dimensioned for the most unfavorable case—for example, high vehicle speed, a high load, a high trailer load or a high external temperature. Blades of the cooling assembly may produce the effect of a smaller opening which is sufficient for most driving conditions. Large openings increase the aerodynamic drag of the vehicle. A small opening may be used for low aerodynamic drag and a large opening for sufficient cooling under different operating conditions. This is achieved by the active shut-off flap arrangement of the cooling assembly.

Furthermore, a fluid temperature of the heat exchanger may be optimized as a primary parameter. Instead of a separate assembly of shut-off flaps, which is usually arranged in the front region of the radiator block, the blades are fastened directly to the cooling pipes of the heat exchanger. The blades are rotated in such a way that a maximum of cooling air flows through the heat exchanger with a hot internal fluid temperature, while a minimum of external cooling air is possible with a cold internal fluid temperature. The actuation may be effected by a bimetallic strip. This strip may detect the fluid temperature by means of a fixed contact with the outer surface of the pipe and may rotate accordingly.

A position of the cooling assembly may be adjusted based on a temperature of a heat exchanger. Instead of a separate assembly of shut-off flaps, which is usually arranged in the front region of the radiator block, the blades may be fastened directly to the cooling pipes of the heat exchanger. The blades may be rotated in such a way that a maximum of cooling air flows through the heat exchanger with a hot internal fluid temperature, while a minimum of external cooling air is possible with a cold internal fluid temperature. The actuation may be effected by a bimetallic strip. This strip may detect the fluid temperature by a fixed contact with the outer surface of the pipe and may rotate accordingly. In addition, a smaller reduction in air from the side in the open position is achieved because the blades may be in line with the cooling pipes.

The blades may be configured as strips and are arranged transversely to a flow direction of the cooling air stream. The air throughput with radiators having transversely disposed cooling pipes or cooling channels may thereby be controlled in a simple manner. The blades may each be arranged in pairs which are connected to one another at a fixed lateral end and have another, free lateral end, so that the blades of each pair open and close in the manner of forceps as a function of their temperature. The openings between the individual forceps may thereby be increased or decreased to provide variable cooling.

The blades may be connected thermally and mechanically to cooling channels of the cooling device. This has the advantage, on the one hand, that no additional fastening and bearing elements for the blades are needed and, on the other, that very little resistance to heat transfer is present, so that rapid control is possible. The blades may be attached to a cooling device such as a fluid radiator, in particular a water radiator. The cooling device may be configured to cool a combustion engine. A warm-up phase of the engine in winter may thereby be shortened, reducing engine wear and saving fuel by adjusting a position of the blades of the cooling assembly adapted to the radiator.

Furthermore, the cooling assembly may be alternatively coupled to a low-temperature cooling device, or heat exchanger, close to the incoming cooling air stream, or a high-temperature heat exchanger further away from the incoming cooling air stream, the high-temperature heat exchanger being incorporated in a high-temperature circuit through which cooling fluid flows at a higher temperature than the cooling fluid in a low-temperature circuit in which the low-temperature cooling part is incorporated. The blades may be arranged in a space-saving manner between the low-temperature and high-temperature heat exchangers.

In one example of the cooling assembly, the blades may be fastened to the low-temperature heat exchanger, in particular to the low-temperature pipes. In another example, the blades may be fastened to the high-temperature cooling part, in particular to the high-temperature pipes. Thus the blades may be arranged between the cooling channels of the low-temperature cooling part or of the high-temperature cooling part and are connected mechanically and thermally to the cooling channels of the low-temperature cooling part or of the high-temperature cooling part.

Turning now to FIG. 1, an example of an engine block 106 coupled to a boosted air cooling path 102 and an engine cooling loop 112 of a vehicle is illustrated in the block diagram 100 of FIG. 1. The vehicle may have a conventional internal combustion engine fueled by gasoline or diesel. Alternatively, the vehicle may be an electric or hybrid electric vehicle that drives the vehicle with only electric power from one or more electric motors during at least some vehicle traveling conditions.

The coolant system described herein for the engine may operate while the engine operates as well as when the engine is stopped and deactivated to cool the engine during electric driving conditions, in one example. The elements shown in block diagram 100 may be contained within a front end compartment of the vehicle. An arrow 108 indicates a direction towards a front of the vehicle and an arrow 110 indicates a direction towards a rear of the vehicle. Block diagram 100 includes an engine cooling loop 112, which may also be a high-temperature cooling loop, that may flow a coolant, e.g., radiator fluid, through a coolant jacket of engine block 106 via radiator hoses, represented by solid arrows 114. The coolant flow is directed through the engine cooling loop 112 by a pump 116 and a temperature of the coolant may be monitored by a thermostat 118. The direction of flow may be used to describe the positioning of elements with respect to one another. An element in the path of a reference point may be referred to as downstream of the reference point. Conversely, an element before a reference point in the path of flow may be described as upstream of the said reference point.

The engine cooling loop 112 is configured to cycle fluid through a radiator 105 arranged towards the front of a front end of the vehicle to derive maximum cooling assistance from ram air across a surface area of the radiator 105. A path of ram air flow, also referred to as a cooling air stream, is indicated by arrow 101. The coolant is flowed to a stationary component, e.g., the engine block 106, to transfer heat away from the engine block 106 via the coolant which has a higher heat capacity than the material forming the engine block 106. An opposite principle of operation is implemented in the boosted air cooling path 102. Therein, the object to be cooled is pressurized air which is flowed through the circuit to be cooled at a stationary cooling device, e.g., a charge air cooler (CAC) 104.

Ambient air may enter the boosted air cooling path 102 at an intake passage 120. The air is drawn into a compressor 122 of a turbocharger 128. The turbocharger 128 may provide boosted air charge to the engine block 106 arranged at a downstream end of the boosted air cooling path 102. The rotation of the compressor 122 may be driven by an exhaust turbine 124 of the turbocharger 128, connected to the compressor 122 by a shaft 126. The turbine 124 may receive exhaust gas from cylinders of the engine block 106 via exhaust passage 125. The rapid expansion of hot exhaust gas compels the rotation of the turbine 124. The spent exhaust gas is then channeled to an after treatment device, such as a catalytic converter, through exhaust path 127. In other examples of a system for providing boosted air, the turbine 124 may be electrically driven or boosted air may be delivered by a supercharger in place of the turbocharger 128.

The air exiting the compressor 122 may experience an increase in temperature due to compression. The warm temperature of the boosted air may result in reduced fuel efficiency as well as higher likelihood of engine knock. To circumvent such issues, the boosted air is passed through the CAC 104, to reduce the temperature of the boosted air and increase the density of the boosted air, thereby improving combustion efficiency. The CAC 104 is positioned downstream of turbocharger 128 and upstream of engine block 106. The boosted air flows from compressor 122 towards the front of the vehicle, indicated by arrow 108, through a first passage 130 of the boosted air cooling path 102 to an inlet end of the CAC 104. Upon passing through the CAC 104, the boosted air becomes cooled and denser. The boosted air leaves the CAC 104 at an outlet end, enters a second passage 132 of the boosted air cooling path 102 and is further flowed to the engine block 106 for ignition in combination with fuel.

In one example, the CAC 104 may be an air-to-air CAC, relying on heat exchange between a front surface of the CAC 104 and ram air flowing across the front surface. As another example, the CAC 104 may be an air-to-water CAC 104 coupled to a water circuit (not shown at FIG. 1) utilizing a higher heat capacity of water versus air to extract heat from the boosted air flowing through the CAC 104. In both examples, the CAC 104 may be similarly arranged adjacent to and in front of the radiator 105.

Active grille shutters (AGS) 150 may be arranged in front of the CAC 104. Ambient airflow from outside the vehicle may enter an engine compartment in the vehicle front end through the AGS 150 and pass across the CAC 104, to aid in cooling the boosted air. The air also flows around the CAC 104 and across surfaces of the radiator 105 to provide air-to-liquid heat transfer from the radiator fluid that has absorbed heat from the engine block 106. An amount of opening of the AGS 150 may be adjusted based on engine operating conditions in order to increase or decrease cooling airflow to the engine compartment. For example, an engine controller 142 may command an active grille shutter position in response to an engine coolant temperature (ECT) via a motor coupled to the AGS 150 (not shown in FIG. 1). The motor may then adjust the AGS 150 into the commanded position.

The controller 142 may be a microcomputer that, in addition to receiving data, may store information such as temperature thresholds, compressor operating maps, look-up tables, etc. The controller 142 may also be a messenger to relay signals between elements shown in FIG. 1. For example, engine cooling loop 112 may be configured so that the controller 142 receives input from the thermostat 118. The thermostat 118 may be a temperature-regulated valve adapted to remain closed and block the coolant flow, indicated by solid arrows 114, during initial vehicle start-up to allow the engine block 106 to warm-up. When the coolant is detected to surpass a temperature threshold which may be pre-set by a manufacturer, the thermostat 118 may open. The controller 142 may receive a signal that the thermostat 118 is actuated to an open position and proceed to turn on the pump 116 to circulate the coolant and lower the temperature of the engine block 106.

By adapting either the radiator 105 or the CAC 104 with a cooling assembly, the cooling of the radiator 105 by air-to-liquid heat exchange may be regulated. A positioning of blades of the cooling assembly, further elaborated in descriptions of FIGS. 3-10, may be adjusted to vary the amount of ram air contacting the front surface of the radiator 105. As such, during cold engine starts where cooling of the radiator 105 is not desired and a temperature of the radiator 105 or CAC 104 is detected to be low, the blades may block or reduce air flow across the radiator 105. As the temperature of the radiator 105 or CAC 104 increases, the positioning of the blades of the cooling assembly may be adjusted to allow greater air flow across the radiator 105 to increase cooling. In this way, the AGS 150 may be maintained closed, thereby reducing drag during vehicle navigation. Furthermore, in some examples, the engine block 106 may be configured without the AGS 150 and without an accompanying actuating mechanism for the AGS 150, resulting in more free space in the vehicle front end.

The positioning of the engine block 106, radiator 105, and CAC 104 of FIG. 1 within a front compartment 202 of a vehicle 200 is shown at FIG. 2. The path of ram air flow is indicated by the arrow 101 and may enter the front compartment 202 through an opening 204 in a front end of the front compartment 202. An AGS, such as the AGS 150 of FIG. 1, may be arranged in the opening 204. Ram air may first flow across the CAC 104, positioned proximal to the opening 204 and in front of the radiator 105. The CAC 104 is spaced away from the radiator 105 so that ram air may flow around the CAC 104 to contact surfaces of the radiator 105. The radiator 105 is arranged in front of the engine block 106 and coupled to the engine block by hoses 206 through which radiator fluid may be circulated.

The space between the CAC 104 and the radiator 105 may accommodate an arrangement of a cooling assembly therein. Blades of the cooling assembly may be fastened at one end to a cooling channel of either the CAC 104 or the radiator 105. An example of a cooling assembly 302 is shown in a first cross-section 300 at FIG. 3, a second cross-section 400 at FIG. 4, and a third cross-section 500 at FIG. 5. The cooling assembly 302 comprises a plurality of blades of which one set of blades 304 is depicted for simplicity. The path of ram air flow is indicated by the arrow 101. A set of reference axes 301 are provided, indicating a "y" vertical direction, a "z" lateral direction, and an "x" horizontal direction.

The set of blades 304 may be connected at a fixed lateral first end 306 to a cooling channel 308 of a high-temperature heat exchanger, such as the radiator 105 of FIGS. 1-2. The set of blades may be attached to the cooling channel 308 by welding, soldering, positively or non-positively connected, or attached using a heat conductive material joint. The first, second, and third cross-sections 300, 400, 500 depict a cross-section of the cooling channel 308 with a circular geometry. In other examples of the cooling channel 308, however, the cross-section of the cooling channel 308 may have a different shape, such as square, rectangular, or oval.

Figure 3:
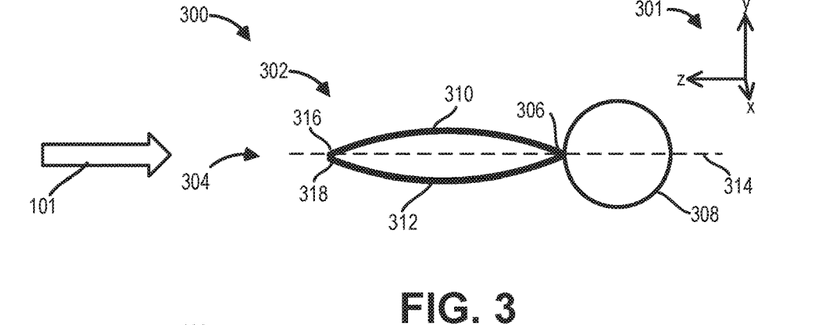
FIG. 3 is a schematic cross-section of an example of a cooling channel of a heat exchanger configured with a cooling assembly in a first position.
Figure 4:
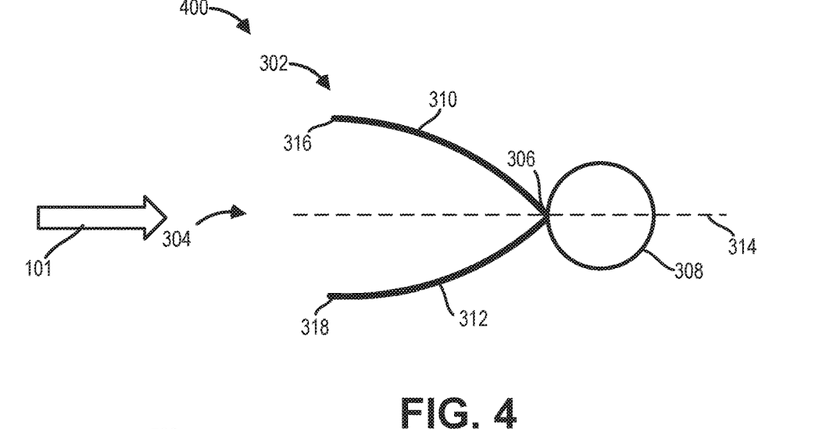
FIG. 4 is a schematic cross-section of an example of a cooling channel of a heat exchanger configured with a cooling assembly in a second position.
Figure 5:
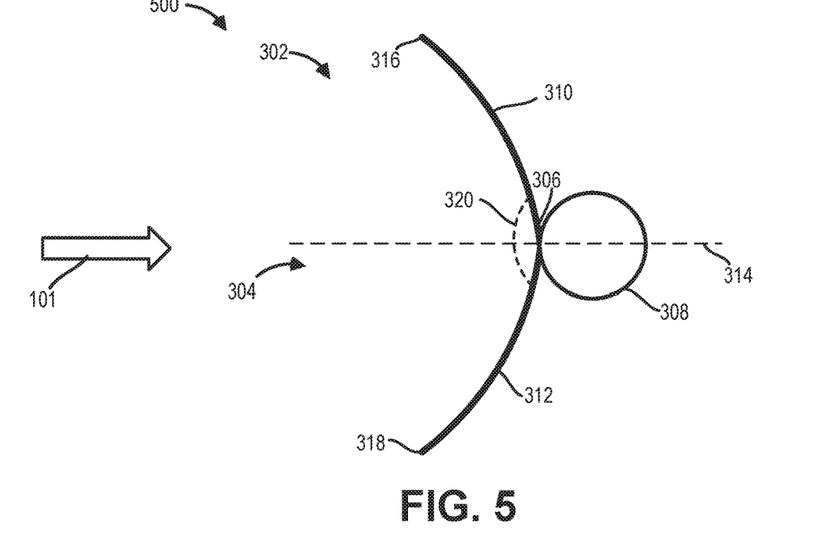
FIG. 5 is a schematic cross-section of an example of a cooling channel of a heat exchanger configured with a cooling assembly in a third position.

At the first end 306 of the set of blades 304, an upper blade 310 and a lower blade 312 are fixed to a surface of the cooling channel 308 and are in contact with one another. The upper blade 310 and the lower blade 312 extend away from the cooling channel 308 along the lateral direction. The upper blade 310 and the lower blade 312 may be mirror-symmetric about a central axis 314 so that the upper blade 310 and lower blade 312 have opposite curvatures. In other words, the upper blade 310 may be convex and the lower 312 blade may be concave relative to the central axis 314.

The set of blades 304 may be pivoted at the first end 306 so that a second end 316 of the upper blade 310 and a second end 318 of the lower blade 312, both of which define a free lateral end of the pair of blades comprising the upper blade 310 and the lower blade 312, may swing through a range of positions, similar to forceps. A first, fully closed, position is shown at FIG. 3 where the second ends 316 and 318 of the set of blades 304 are in contact and mid-sections of the upper blade 310 and lower blade 318 curve away from the central axis 314. The set of blades 304 are arranged in a second, more open position, at FIG. 4 than the first position of FIG. 3 showing the second ends 316 and 318 spaced away from one another. At FIG. 5, the set of blades 304 are shown in a third, fully open position, where the upper blade 310 and lower blade 312 are pivoted so that the second ends 316 and 318 are further apart than in the second position of FIG. 4. The third position may represent a maximum opening of the set of blades 304.

The adjusting of the set of blades 304 between the first, second, and third positions shown at FIGS. 3-5, as well as any positions between the first and third positions, may be activated by a response of the material from which the set of blades 304 may be formed to a temperature of the cooling channel 308. The blades of a cooling assembly, such as the cooling assemblies of FIGS. 3-5, are formed from bimetallic strips which comprise two different metals joined together that expand at different rates upon experiencing temperature change. The different expansions compel a bending of the strips in a first direction upon heating and bending in a second direction upon cooling. Thus the blades, fixed at one end, may bend and move at another free end when attached to an object that transfers heat to the blades. An example of the attachment of the blades to a heat conducting object is shown at FIG. 6.

Figure 6:
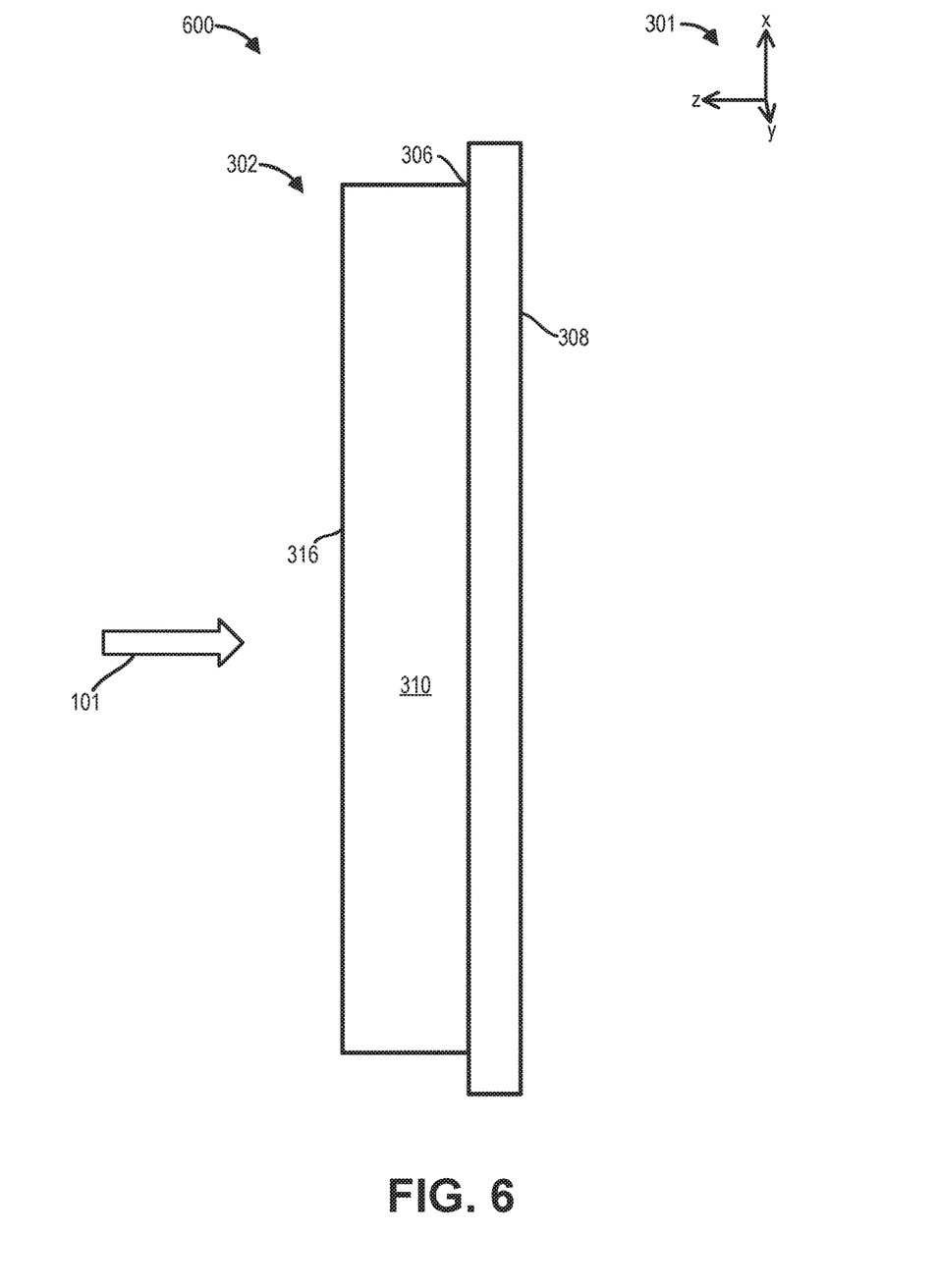
FIG. 6 is a schematic top view of an example of a cooling channel of a heat exchanger configured with a cooling assembly.

At FIG. 6, a top view 600 of the cooling assembly 302, attached at the first end 306 to the cooling channel 308, shows the upper blade 310 to be rectangular and strip-shaped and arranged transversely to the path of ram air so that a length of the upper blade is coaxial with a length of the cooling channel 308, the lengths being defined along the horizontal direction. The upper blade 310 is also curved relative to the plane formed by the horizontal and lateral directions. The length of the upper blade 310 (and lower blade 312) may extend along an entire length of the cooling channel 308 or a portion thereof. Both the upper blade 310 and lower blade 312 may be formed from bimetallic strips. Changes in temperature at the first cooling channel may be transmitted to the bimetallic strips of the set of blades 304 and translated into mechanical displacement of the set of blades 304.

For example, when the temperature of the cooling channel 308 of the radiator increases due to engine operation under high loads, such as navigating uphill or towing a trailer hitched to the vehicle, or during high ambient temperatures, increasing cooling air flow across the radiator may be desired. The heat generated at the engine block is transferred to the coolant flowing through the radiator. Heat conducted from the coolant through the surface of the cooling channel 308 to the bimetallic strips actuates the set of blades 304 to the first position of FIG. 3, minimizing restriction of air flow across the surface of the cooling channel 308. A distance between the set of blades 304 and another set of blades either above or below is increased, allowing more air to be delivered to the cooling channel 308 compared to the second or third positions of FIGS. 4 and 5, respectively. In addition, the closed first position of the set of blades 304 is aerodynamically favorable, thus conserving fuel consumption.

During vehicle operation at low engine speeds, e.g., cruising or idling, which may also be referred to as nominal driving conditions, the temperature of the engine block may be lower than the temperatures described for the first position of FIG. 3. The cooler temperature of the engine, and thus of the cooling channel 308 may activate the opening of the set of blades 304 into the second position of FIG. 4. The upper blade 310 and lower blade 312 are spread apart at the second ends 316 and 318. The space between the set of blades 304 and another set of blades either above or below is narrowed, reducing the flow of air delivered to the surface of the cooling channel 308 compared to the first position of FIG. 3, and restricting the amount of cooling provided by ram air.

The third position shown at FIG. 5 illustrates the set of blades 304 in a fully open position where the upper blade 310 and lower blade 312 are spread even further apart at the second ends 316 and 318 than in the second position of FIG. 4. Conditions such as cold ambient temperature or cold engine starts may actuate the set of blades 304 to the third position. Space between the set of blades 304 and another set of blades either above or below may be minimized or eliminated. In some examples, the upper blade 310 may overlap with a lower blade of a set of blades above the upper blade 310 and the lower blade 312 may overlap with an upper blade of a set of blades below the lower blade 312. Air flow around the set of blades 304 through the space between the set of blades 304 and another adjacent set of blades may be blocked so that cooling from heat exchange with ram air is avoided, allowing a temperature of the heat exchanger to increase.

The first, second, and third positions shown at FIGS. 3-5 show exemplary configurations to which temperature changes at the engine block may induce actuation of the bimetallic strips of the cooling assembly 302. It will be appreciated, however, that the positions depicted at FIGS. 3-5 are non-limiting examples of arrangements of the cooling assembly 302 and the set of blades 304 may be adjusted to any position in between the first and third positions of FIGS. 3 and 5. An angle of opening 320 is shown at FIG. 5, showing a degree of separation between the upper blade 310 and lower blade 312. In one example, the angle of opening 320 may range between 10° when the set of blades 304 are closed (such as shown in FIG. 3), due to the curvature of the set of blades 304, up to 150° when the set of blades 304 are fully open (such as shown in FIG. 5). In other examples, the angle of opening may be 60° to 90°, e.g., the set of blades do not close, or opened to a maximum of 180°. In this way, a high conduit temperature activates the set of blades 304 to move or rotate towards one another, as shown at FIG. 3. In colder conditions, such as low external temperature, low engine power, etc., the set of blades 304 move apart, and do so without being subjected to an external force.

As described above, the set of blades 304 may be arranged between a low temperature heat exchanger, such as the CAC 104 of FIGS. 1-2, and a high temperature heat exchanger, such as the radiator 105 of FIGS. 1-2. By arranging the set of blades 304 of the cooling assembly 302 between the CAC 104 and the radiator 105, the cooling assembly may be protected from impact with foreign bodies, such as stones, that may become dislodged from the road during vehicle navigation. A positioning of the set of blades 304 between the CAC 104 and the radiator 104 is shown at FIGS. 7-10. The CAC 104 is in front of the radiator 105 relative to the path of ram air flow, as indicated by the arrow 101.

The CAC 104 comprises cooling conduits 702 stacked linearly along the vertical direction. The cooling conduits 702 are depicted with circular cross-sections but may, in other examples, have square, rectangular, oval, etc. as well as other variations in shape. Furthermore, the CAC 104 is shown with similar dimensions to the radiator 105 at FIGS. 7-10 but may be vary in size with respect to the dimensions of the radiator 105. For example, other embodiments of the CAC 104 may be taller, shorter, narrower, or thicker, etc., than the radiator 105. The set of blades 304 of the cooling assembly 302 is fixed at the first end 306 to the cooling channel 308 of radiator 105, as shown in the cross-section 700 of the CAC 104 and radiator 105 shown at FIG. 7, similar to the configurations of the cooling assembly 302 illustrated at FIGS. 3-6.

The set of blades 304 are of a length, defined along the lateral direction, that allows the respective second ends 316, 318 of the upper and lower blades 310, 312 to be spaced away from a rear surface 704 of the CAC 104. The length of the set of blades 304 may extend a distance across a space between the CAC 104 and radiator 105 that may be 30%, 50%, 90%, etc., of the space. A gap between the rear surface 704 of the CAC 104 and the set of blades 304 forms inlets 706 and a path for air to flow around the CAC 104 and across surfaces of the radiator 105 between the set of blades 304 and adjacent sets of blades 304 when the set of blades 304 is not actuated to the third, open position of FIG. 5.

The space between the respective second ends 316, 318 of the upper and lower blades 310, 312 of the set of blades 304 is shown from a top view 800 at FIG. 8. The upper blade 310 of the set of blades 304 extends along a width of the radiator 105, defined along the horizontal direction, attached to the cooling channel 308 at the first end 306 and extend at least along a portion of the width between coolant reservoirs 802 of the radiator 105. Pivoting of the set of blades 304 at the first end 306 may be based on a temperature change transmitted to the set of blades 304, formed from a bimetallic material, from the cooling channel 308. As such, an increase in temperature may actuate the set of blades 304 to a more closed position to allow more air to contact the cooling channel 308, while lower temperatures effect a pivoting of the set of blades 304 to a more open position. Alternatively, the set of blades 304 may be fastened, at the first end 306, to the rear surface 704 of the CAC 104, as shown at FIGS. 9-10.

Figure 9:
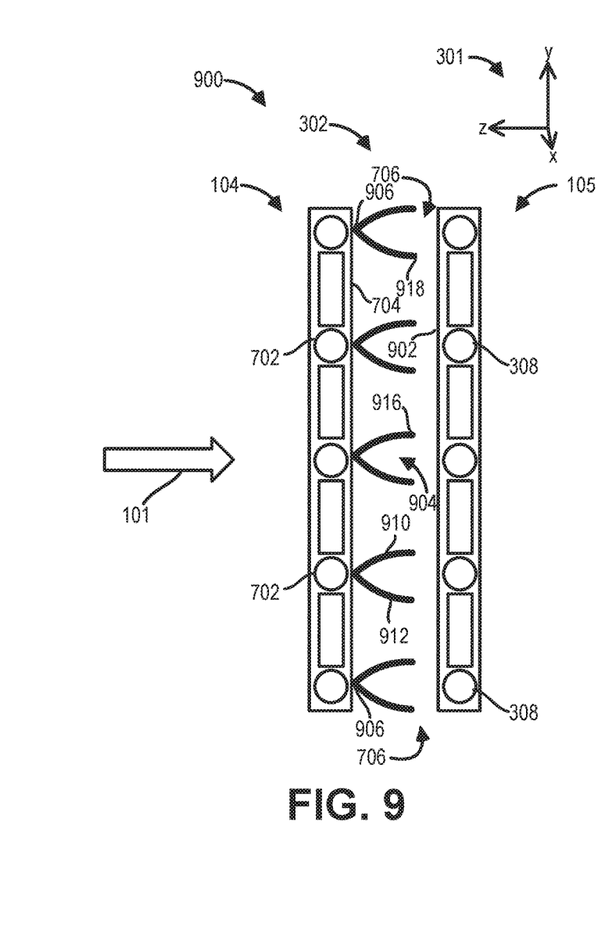
FIG. 9 is a cross-section of the arrangement of a cooling assembly on cooling channels of a low-temperature heat exchanger.
Figure 10:
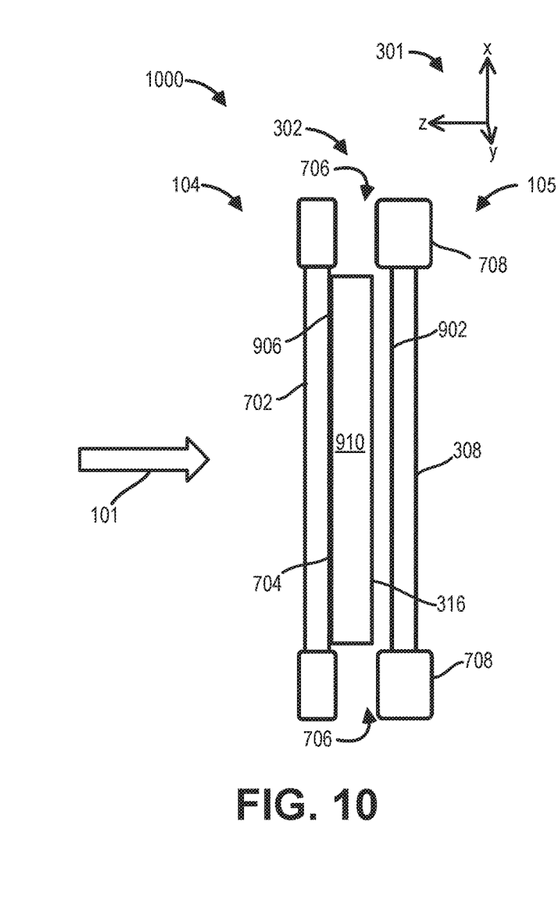
FIG. 10 is a top view of the arrangement of a cooling assembly on cooling channels of a low-temperature heat exchanger.

In a cross-section 900 illustrated at FIG. 9, a set of blades 904 may be oriented oppositely from the arrangement of FIG. 7 so that a first end 906 is proximal and connected to one of the cooling conduits 702 of the CAC 104 and respective second ends 916, 918 of an upper blade 910 and a lower blade 912 extend away from the CAC 104 along the lateral direction. The respective second ends 916, 918 of the upper and lower blades 910, 912 are spaced away from a front surface 902 of the radiator 105. The length of the set of blades 904 may extend a distance across the space in between the CAC 104 and the radiator 105 that is a portion of the space, such as 30%, 50%, or 90%, etc. In this configuration, air flow into the inlets 706 and through the gap between the set of blades 904 and the front surface 902 of the radiator 105 allows ram air to contact surfaces of the cooling channels 308 of the radiator 105. Adjustment of the position of the set of blades 904 of the cooling assembly 302 may not affect air-to-coolant cooling of the radiator 105. Instead, opening and closing the set of blades 904 may control heat transfer from the cooling conduits 702 of the CAC 104 to ram air.

A top view 1000 depicted at FIG. 10 of the arrangement of the cooling assembly 302 relative to the CAC 104 and radiator 105 shows the extension of the upper blade 910 of the set of blades 904 along a width of the CAC 104, defined along the horizontal direction. The set of blades 904 may extend along the entire width of the CAC 104 or a portion thereof. The actuation of the set of blades 904 between the first, closed position of FIG. 3 and third, open position of FIG. 5, and any position in between, regulates air-to-air cooling of the boosted air flowing through the cooling conduits 702 of the CAC 104. The embodiment of the cooling assembly 302 shown at FIGS. 9-10 may accommodate driving events where cooling of the boosted air in the CAC 104 is desired before cooling of the engine block by the radiator 105.

For example, when the set of blades 904 is closed, ram air may flow freely between the one of the cooling conduits 702 and cooling conduits arranged above or below, effectively transferring heat from one of the cooling conduits 702 to the air flowing past. When the set of blades 904 is fully open, e.g., in the third position, gaps between the one of the cooling conduits 702 and adjacent cooling conduits may be mostly or completely blocked by the spread of the set of blades 904. Actuation of the set of blades 904 to the various positions may be based on conduction of heat from a surface of one of the cooling conduits 702 to the bimetallic material of the set of blades 904, with a rise in temperature resulting in a more closed position of the set of blades 904. Conversely, a cooler temperature of one of the cooling conduits 702 results in the increased opening of the set of blades 904.

The two configurations of the cooling assembly 302 shown at FIGS. 7-10 are non-limiting examples of the cooling assembly 302. In other embodiments, the cooling assembly may be disposed in a rear compartment of the vehicle, if the vehicle is adapted with a rear engine. As another example, the set of blades 304 and/or 904 may be attached to both the CAC 104 and the radiator 105 in an alternating pattern or fixed to a front surface of the CAC 104 instead of the rear surface 704. Furthermore, the cooling assembly 302 may comprise two groups of the set of blades 304 and/or 904, with a first group connected to the CAC 104 and a second group connected to the radiator 105. The cooling of the heat exchangers may be further enhanced by such alternative embodiments of the cooling assembly 302.

A cooling assembly comprising adjustable sets of bimetallic blades connected to a radiator may regulate cooling of the heat exchanger by air-to-air heat transfer. The cooling assembly may comprise blade pairs, configured as shown at FIGS. 3-5, 7, and 9. The radiator may be arranged in a front compartment of a vehicle, behind and spaced away from a CAC. Example operations of a method 1100 for operating the cooling assembly is provided at FIG. 11. Execution of methods 1100 and the rest of the methods included herein may be based on translation of a heat transfer between the radiator and the bimetallic blades of the cooling assembly, into a mechanical displacement of the blades according to a magnitude of the difference in temperature.

Figure 11:
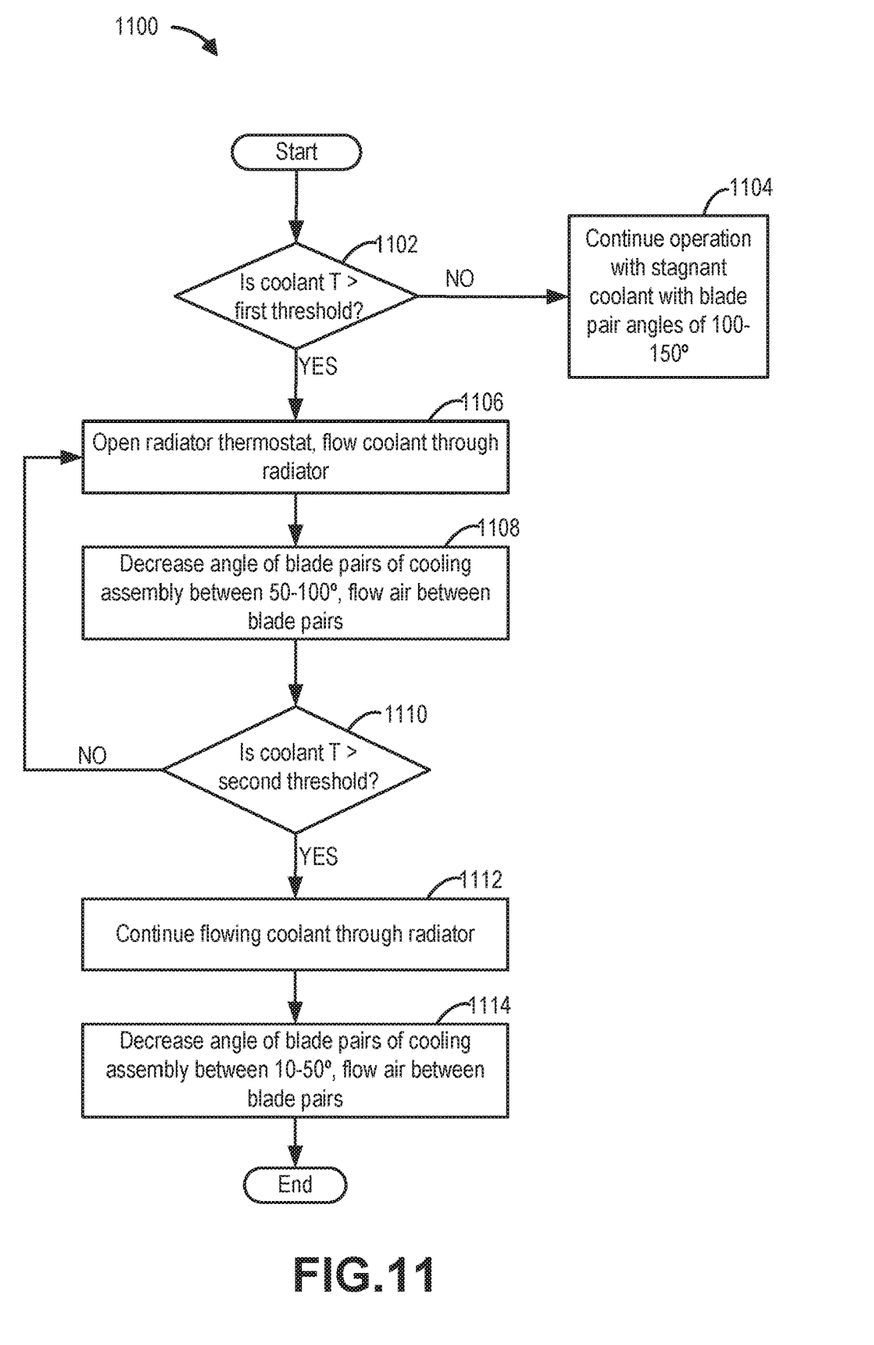
FIG. 11 is a flow chart of an example method for operation of a cooling assembly coupled to cooling channels of a heat exchanger.

Turning now to FIG. 11, at 1102, it may be determined if a temperature of a coolant within channels of a heat exchange device, such as the radiator 105 of FIGS. 1-2, is below a first temperature threshold. The first temperature threshold may be a minimum temperature at which the engine is at a sufficiently warm temperature to reduce the viscosity of engine oil, allowing the oil to effectively lubricate engine components. Conventional internal combustion engines operate may have a lower boundary of optimal engine operation, e.g., sufficient lubrication, between 80-90° C. An engine coolant temperature (ECT), measured by a temperature sensor arranged in the engine may be used to evaluate if the first temperature threshold has been reached. The first temperature threshold may be lower than the lower temperature boundary for engine operation by an amount due to the higher heat capacity of coolant versus metal. In one example, the first temperature threshold may be 70° C., representing an engine block temperature of 80° C. In other examples, the first temperature threshold may be a temperature between 70-80° C.

If the ECT is lower than the first threshold, the method continues to 1104 to continue vehicle operation with stagnant coolant in the radiator and with the blade pairs of the cooling assembly arranged at an angle between 100-150°.e.g., spread wide apart so that gaps between each blade pair is mostly or entirely blocked. The position of the blade pairs may be similar to the third position of FIG. 5. Contact between the surfaces of the radiator and ram air is minimized to prevent cooling of the engine block through heat transfer to the radiator coolant. This may occur during engine cold starts or engine operation under low or no load resulting in a low temperature of the coolant, e.g. at ambient temperature.

If the ECT is at or higher than the first threshold, a pump may be actuated on and a thermostat, arranged in a coolant circuit of the radiator, may open at 1106 to allow coolant to flow through the channels of the radiator. Furthermore, at 1108, the blade pairs may pivot the blades in response to an increase in temperature that is conducted to the bimetallic material of the blades from the coolant in the radiator channels through walls of the channels. The blade pairs may become less spread apart with angles between 50-100°, thereby increasing the width of the gaps between blade pairs and increasing contact between surfaces of the radiator and ram air, similar to the second position of the blade pairs shown at FIG. 4.

The bimetallic material of the blades of the cooling assembly translate heat absorption into movement of the blades in an opposite direction at temperatures above the first temperature threshold. Increased heat generation at an engine block may occur during higher engine loads and speeds that is transferred to coolant circulated through the radiator. The amount of closing of the blades may be based on the temperature of the radiator. For example, as the temperature of the radiator increases, the blades are more closed. As the temperature of the radiator decreases the blades are more open.

Adjusting the blades to the second position includes pivoting the ends of the blades that are not attached to the radiator so that gaps between each pair of blades are widened and air is allowed to flow across the radiator. The air flow may extract heat from the coolant circulating through radiator, thereby increasing the cooling capacity of the coolant to reduce the temperature of the engine block.

At 1110 of the method, it may be determined if the ECT reaches a second temperature threshold. The second temperature threshold is set at a higher temperature than the first temperature threshold and may be based on a maximum temperature for engine operation without degradation of parts. During increased engine speeds and loads, the temperature of the engine block may rise. The second temperature threshold may be a temperature between 120-130° C., which may be 20-30° C. below a maximum temperature for stability of engine oil to provide a threshold to avoid decomposition of the oil. The temperature of the engine block may be 20-30° C. higher than the ECT due to the higher heat capacity of coolant versus metal.

If the temperature of the radiator that is transmitted to the blades of the cooling assembly does not reach the second temperature threshold, vehicle operation returns to 1106 to continue flowing coolant through the radiator with the blade pairs angled between 50-100°. If the temperature of the radiator is determined to reach or pass the second temperature threshold, however, the method proceeds to 1112 to continue flowing coolant through the radiator. The coolant flow may also travel to other components, such as the battery and an AC component, in addition to the engine and radiator. At 1114, the greater heat generated at the engine block is transferred to the blades of the cooling assembly, resulting in the pivoting of the blade pairs to a fully closed position, such as the first position of FIG. 3. The gaps between the pairs of blades are widened further and air flow across surfaces of the radiator is increased for a maximum cooling effect.

In this way, an engine may be efficiently cooled without additional parts occupying space in a vehicle's front end or increasing energy consumption. By adapting an engine radiator with a cooling assembly directly attached to cooling channels of the radiator and comprising self-regulating bimetallic blades configured to open or close based on heat conduction, heat exchange between the radiator coolant and ram air may be controlled. A position of the blades may be adjusted to vary between a fully open position when the radiator temperature is cool, e.g. at ambient temperature, and a fully closed position when the radiator temperature increases and any position in between, based on heat transferred from the radiator. Gaps between pairs of the blades narrow or widen according to the mechanical displacement of the blades in response to changes in temperature, thereby regulating the amount of cooling air that comes in contact with surfaces of the radiator and eliminating individual actuators for the movement of the blades.

Alternatively, the blades of the cooling assembly may be fixed to cooling conduits of a charge air cooler, arranged in front of the radiator relative to ram air flow. The positions of the blades are similarly adjusted in response to heat conducted from the air flowing through the charge air cooler to the bimetallic blades. In this configuration, air-to-air cooling of the charge air cooler may be regulated instead of the radiator. The technical effect of adapting a heat exchanger with bimetallic blades of the cooling assembly is that a temperature of a vehicle component coupled to the heat exchanger may be controlled.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example, a device for controlling a temperature of a vehicle component includes a plurality of blades coupled to a first cooling device or a second cooling device of the vehicle and controlling a cooling air stream, the plurality of blades controlling a size of at least one air inlet opening and/or a flow of the cooling air stream, the plurality of blades comprising bimetallic blades configured such that bending and movement of each blades takes place automatically with a change of temperature of each blade in order to control the cooling air stream by varying a position of each blade. In a first example of the device, each blade is strip-shaped and is arranged transversely to a flow direction of the cooling air stream. A second example of the device optionally includes the first example and further includes wherein the plurality of blades are arranged in one or more sets of blade pairs each including two blades which are connected to one another at a fixed lateral end and have another, free lateral end, so that the two blades of each blade pair open and close in the manner of forceps as a function of blade temperature. A third example of the device optionally includes one or more of the first and second examples, and further includes, wherein the plurality of blades are connected thermally and mechanically to cooling channels of the cooling device. A fourth example of the device optionally includes one or more of the first through third devices, and further includes, wherein the cooling device is in the form of a liquid cooler. A fifth example of the device optionally includes one or more of the first through fourth devices, and further includes, wherein the cooling device is configured to cool a combustion engine of the vehicle. A sixth example of the device optionally includes one or more of the first through fifth devices, and further includes, wherein the cooling device comprises a low-temperature cooling part close to the incoming cooling air stream and a high-temperature cooling part located behind the low-temperature cooling part and further away from the incoming cooling air stream, the high-temperature cooling part being incorporated in a high-temperature circuit through which cooling fluid flows at a higher temperature than cooling fluid in a low-temperature circuit in which the low-temperature cooling part is incorporated. A seventh example of the device optionally includes one or more of the first through sixth devices, and further includes, wherein the plurality of blades are arranged between cooling channels of the low-temperature cooling part or of the high-temperature cooling part and are connected mechanically and thermally to the cooling channels of the low-temperature cooling part or of the high-temperature cooling part. An eighth example of the device optionally includes one or more of the first through seventh devices, and further includes, wherein the plurality of blades are integrated in the cooling device. An ninth example of the device optionally includes one or more of the first through eighth devices, and further includes, wherein the plurality of blades are arranged into blade pairs each including two blades, and wherein the blade pairs are aligned vertically and arranged in a space between the first cooling device of a low-temperature cooling circuit and the second cooling device of a high-temperature cooling circuit. A tenth example of the device optionally includes one or more of the first through ninth devices, and further includes, wherein the blade pairs each comprise an upper blade and a lower blade with oppositely curving geometries so that the upper blade and lower blade have points of contact at a fixed lateral end and a free lateral end. An eleventh example of the device optionally includes one or more of the first through tenth devices, and further includes, wherein the blade pairs are fastened to the cooling device of the high-temperature cooling part at the fixed lateral end, and the free lateral end of the blade pairs is spaced away from the cooling device of the low-temperature cooling part. A twelfth example of the device optionally includes one or more of the first through eleventh devices, and further includes, wherein the blade pairs are fastened to the cooling device of the low-temperature cooling part at the fixed lateral end, the free lateral end of the blade pairs is spaced away from the cooling device of the high-temperature cooling part. A thirteenth example of the device optionally includes one or more of the first through twelfth devices, and further includes, wherein when a temperature of the cooling device to which the blade pairs are fixed is within a first temperature, lower range, the blade pairs are actuated to a first range of positions that block the cooling air stream from contacting the cooling device. A fourteenth example of the device optionally includes one or more of the first through thirteenth devices, and further includes, wherein when the temperature of the cooling device to which the blade pairs are fixed is within a second, higher range, the blade pairs are actuated to a second range of positions to increase the flow of the cooling air stream and the cooling effect of the cooling air stream.

In another example, a method for controlling vehicle component temperatures via a cooling device having a plurality of bimetallic blades includes controlling a cooling air stream and size of air inlet opening and/or the cooling air stream via the blades by bending and moving the blades. In a first example of the method, the air stream is passed over multiple components including an engine and a battery.

As another example, a method for an electrically driven vehicle includes bending and moving bimetallic blades to vary a cooling air stream to a battery of the vehicle. In a first example of the method, the vehicle is a hybrid-electric vehicle with an internal combustion engine. A second example of the method optionally includes the first example and further includes wherein the vehicle is an electric vehicle without an engine.

Note that the example control and estimation routines included herein may be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology may be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device for controlling a temperature of a vehicle component, comprising:
    a plurality of blades coupled to a first cooling device or a second cooling device of the vehicle and controlling a cooling air stream, the plurality of blades controlling a size of at least one air inlet opening and/or a flow of the cooling air stream, the plurality of blades comprising bimetallic blades configured such that bending and movement of each blade takes place automatically with a change of temperature of each blade in order to control the cooling air stream by varying a position of each blade,
    wherein the plurality of blades is connected thermally and mechanically to cooling channels of the cooling device, and
    wherein the cooling device is in the form of a liquid cooler.

2. The device as claimed in claim 1, wherein each blade is strip-shaped and is arranged transversely to a flow direction of the cooling air stream.

3. The device as claimed in claim 1, wherein the plurality of blades is arranged in one or more sets of blade pairs each including two blades which are connected to one another at a fixed lateral end and have another, free lateral end, so that the two blades of each blade pair open and close in the manner of forceps as a function of blade temperature.

4. The device as claimed in claim 1, wherein the cooling device is configured to cool a combustion engine of the vehicle.

5. The device as claimed in claim 4, wherein the cooling device comprises a low-temperature cooling part close to the incoming cooling air stream and a high-temperature cooling part located behind the low-temperature cooling part and further away from the incoming cooling air stream, the high-temperature cooling part being incorporated in a high-temperature circuit through which cooling fluid flows at a higher temperature than cooling fluid in a low-temperature circuit in which the low-temperature cooling part is incorporated.

6. The device as claimed in claim 5, wherein the plurality of blades is arranged between cooling channels of the low-temperature cooling part or of the high-temperature cooling part and is connected mechanically and thermally to the cooling channels of the low-temperature cooling part or of the high-temperature cooling part.

7. The device as claimed in claim 1, wherein the plurality of blades is integrated in the cooling device.

8. The device of claim 1, wherein the plurality of blades is arranged into blade pairs each including two blades, and wherein the blade pairs are aligned vertically and arranged in a space between the first cooling device of a low-temperature cooling circuit and the second cooling device of a high-temperature cooling circuit.

9. The device of claim 8, wherein the blade pairs each comprise an upper blade and a lower blade with oppositely curving geometries so that the upper blade and the lower blade have points of contact at a fixed lateral end and a free lateral end.

10. The device of claim 9, wherein the blade pairs are fastened to the second cooling device of the high-temperature cooling part at the fixed lateral end, and the free lateral end of the blade pairs is spaced away from the first cooling device of the low-temperature cooling part.

11. The device of claim 9, wherein the blade pairs are fastened to the first cooling device of the low-temperature cooling part at the fixed lateral end, the free lateral end of the blade pairs is spaced away from the second cooling device of the high-temperature cooling part.

12. The device of claim 8, wherein when a temperature of the cooling device to which the blade pairs are fixed is within a first temperature, lower range, the blade pairs are actuated to a first range of positions that block the cooling air stream from contacting the cooling device.

13. The device of claim 12, wherein when the temperature of the cooling device to which the blade pairs are fixed is within a second, higher range, the blade pairs are actuated to a second range of positions to increase the flow of the cooling air stream and a cooling effect of the cooling air stream.

14. A method for controlling vehicle component temperatures, comprising:
    via a cooling device having a plurality of bimetallic blades positioned between a charge air cooler and a radiator,
    controlling a cooling air stream and a size of an air inlet opening and/or the cooling air stream via the blades by bending and moving the blades.

15. The method of claim 14, further comprising passing the cooling air stream over multiple components including an engine and a battery.

16. A method for an electrically driven vehicle, comprising:
    bending and moving bimetallic blades to vary a cooling air stream to a battery of the vehicle.

17. The method of claim 16, wherein the vehicle is a hybrid-electric vehicle with an internal combustion engine.

18. The method of claim 16, wherein the vehicle is an electric vehicle without an engine.

* * * * *